(12) United States Patent
Dach

(10) Patent No.: US 12,544,693 B2
(45) Date of Patent: Feb. 10, 2026

(54) ROTARY DRUM FILTERING MACHINE FOR ALGAE FILTRATION

(71) Applicant: ALGAECORE TECHNOLOGIES LTD, Kibutz Glil-Yam (IL)

(72) Inventor: Baruch Dach, Tel-Mond (IL)

(73) Assignee: ALGAECORE TECHNOLOGIES LTD, Kibutz Glil-Yam (IL)

(*) Notice: Subject to any disclaimer, the term of this patent is extended or adjusted under 35 U.S.C. 154(b) by 67 days.

(21) Appl. No.: 18/689,973

(22) PCT Filed: Sep. 6, 2022

(86) PCT No.: PCT/IL2022/050973
§ 371 (c)(1),
(2) Date: Mar. 7, 2024

(87) PCT Pub. No.: WO2023/037364
PCT Pub. Date: Mar. 16, 2023

(65) Prior Publication Data
US 2024/0375028 A1    Nov. 14, 2024

Related U.S. Application Data

(60) Provisional application No. 63/242,833, filed on Sep. 10, 2021.

(51) Int. Cl.
*B01D 33/11* (2006.01)
*B01D 33/067* (2006.01)
*B01D 33/46* (2006.01)

(52) U.S. Cl.
CPC ............ *B01D 33/11* (2013.01); *B01D 33/067* (2013.01); *B01D 33/466* (2013.01)

(58) Field of Classification Search
None
See application file for complete search history.

(56) References Cited

U.S. PATENT DOCUMENTS

| | | | | |
|---|---|---|---|---|
| 1,726,608 A | * | 9/1929 | Whitwell | B01D 33/466 |
| | | | | 210/161 |
| 2,652,588 A | * | 9/1953 | Harris | A22C 29/046 |
| | | | | 452/15 |

(Continued)

FOREIGN PATENT DOCUMENTS

| | | |
|---|---|---|
| CN | 106669261 A | 5/2017 |
| CN | 206700905 U | 12/2017 |

(Continued)

OTHER PUBLICATIONS

International Search Report for Application No. PCT/IL2022/050973, dated Dec. 13, 2022, 3 pages.

(Continued)

*Primary Examiner* — Robert J Popovics
(74) *Attorney, Agent, or Firm* — Brooks Kushman P.C.

(57) ABSTRACT

Rotary drum filtering machine and method for filtration of harvested algae. A filtering drum, axially rotatable horizontally, includes a filtration basket with thermally coupled mesh netting for retaining algae and passing through liquid when filtering drum is rotated. Feeding liquid containing algae is fed into filtering drum via inlet pipe. Filtered algae retained on internal surface of filtration basket is scraped and collected, and removed through outlet pipe. Filtration basket is axially embedded and releasably secured to a support frame. Mesh netting is thermally pressed into filtration basket such that filtration basket polymer material penetrates through mesh netting apertures, and polymeric rod thermally pressed onto mesh netting fuses to filtration basket polymer material with mesh netting contained therebetween. Mesh netting includes wired mesh with wire diameter less than 1,000 pm and micron sized apertures having aperture diameter of 1 pm-500 pm to enable filtration of micron sized algae.

12 Claims, 8 Drawing Sheets

(56) References Cited

U.S. PATENT DOCUMENTS

| | | | | |
|---|---|---|---|---|
| 3,876,548 A * | 4/1975 | Welles, Jr. | ............ | B01D 33/39 210/402 |
| 3,951,805 A * | 4/1976 | Dodd | ................ | B01D 33/463 210/396 |
| 3,979,289 A * | 9/1976 | Bykowski | ............. | B01D 33/76 210/403 |
| 4,038,187 A * | 7/1977 | Saffran | ................ | B01D 33/067 210/411 |
| 4,198,299 A * | 4/1980 | Ewing | .................. | B01D 33/11 210/403 |
| 4,224,166 A * | 9/1980 | Wyman | ................. | B01D 33/50 210/402 |
| 4,236,999 A * | 12/1980 | Burgess | .............. | B01D 33/275 209/400 |
| 4,248,033 A * | 2/1981 | Bryant | .................... | B63H 5/02 56/8 |
| 4,255,261 A * | 3/1981 | Dodd | ..................... | B01D 25/38 210/396 |
| 4,280,913 A * | 7/1981 | Applegate | ........... | B01D 33/808 210/669 |
| 4,306,975 A * | 12/1981 | Siewert | .................... | D21B 1/32 210/403 |
| 4,465,600 A * | 8/1984 | Dodd | .................... | B01D 39/04 210/784 |
| 4,507,202 A * | 3/1985 | Nord | ...................... | B01D 33/11 210/197 |
| 4,620,927 A * | 11/1986 | Casper | ................ | B01D 33/067 210/403 |
| 4,725,292 A * | 2/1988 | Williams | ............... | B01D 46/26 95/278 |
| 4,869,823 A * | 9/1989 | Otani | ..................... | B01D 33/11 210/403 |
| D327,693 S * | 7/1992 | Berry | .......................... | D15/141 |
| 5,300,225 A * | 4/1994 | Fischer | ................ | B01D 33/503 210/402 |
| 5,464,542 A * | 11/1995 | Grienberger | ......... | B03D 1/1475 210/791 |
| 5,558,042 A * | 9/1996 | Bradley | ............... | A01K 63/045 210/402 |
| 5,628,912 A * | 5/1997 | Nesseth | ............... | B01D 33/801 210/402 |
| 5,798,039 A * | 8/1998 | Wiesemann | ......... | B01D 33/801 210/402 |
| 5,853,585 A * | 12/1998 | Nesseth | ............... | B01D 33/801 210/402 |
| 6,227,379 B1 * | 5/2001 | Nesseth | ............... | B01D 33/215 210/402 |
| 6,270,669 B1 * | 8/2001 | Bauer | .................... | B01D 35/05 210/402 |
| 6,274,054 B1 * | 8/2001 | Murphy, Jr. | ............. | C02F 1/505 210/764 |
| 6,395,187 B1 * | 5/2002 | Alanis | ................. | B01D 29/6484 100/145 |
| 6,651,822 B2 * | 11/2003 | Alanis | ............... | B01D 29/6476 100/145 |
| 7,001,515 B2 * | 2/2006 | Sawhill | .................... | A23B 4/26 210/402 |
| 7,037,437 B2 * | 5/2006 | Sawhill | ................ | B01D 33/073 210/402 |
| 7,258,238 B2 * | 8/2007 | Raghupathy | ....... | B01D 29/6476 210/411 |
| 7,293,658 B2 * | 11/2007 | Cummins | .............. | B01D 33/48 210/403 |
| 7,347,933 B2 * | 3/2008 | Berry, III | ............. | B01D 33/073 210/791 |
| 7,351,269 B2 * | 4/2008 | Yau | .......................... | A47L 9/20 55/296 |
| 7,461,744 B2 * | 12/2008 | Hautala | ..................... | D21F 1/74 209/44.3 |
| 8,317,034 B2 * | 11/2012 | Fetrow | ...................... | B03B 5/56 210/402 |
| 8,518,132 B2 * | 8/2013 | Rettenmaier | ............. | C10L 5/44 44/628 |
| 8,535,543 B2 * | 9/2013 | Fetrow | ...................... | B03B 5/52 210/402 |
| 9,567,562 B1 * | 2/2017 | Collins | ..................... | F26B 3/00 |
| 9,809,464 B2 * | 11/2017 | Bryan | .................... | C12M 23/18 |
| 9,968,872 B2 * | 5/2018 | Carayon | ............... | B01D 33/073 |
| 10,351,815 B2 * | 7/2019 | Hazlebeck | ............. | B01D 63/04 |
| 10,391,429 B2 * | 8/2019 | Carayon | ............... | B01D 33/503 |
| 10,501,721 B2 * | 12/2019 | Hazlebeck | ............... | C12N 1/02 |
| 10,549,224 B2 * | 2/2020 | Carayon | ............. | B01D 33/503 |
| 10,583,379 B2 * | 3/2020 | Cote | ....................... | B01D 33/11 |
| 10,792,595 B2 * | 10/2020 | Van den Berg | ....... | B01D 33/073 |
| 10,851,511 B2 * | 12/2020 | Shurtleff | ................ | C10L 1/02 |
| 10,934,520 B2 * | 3/2021 | Hazlebeck | ............. | B01D 63/04 |
| 10,946,318 B2 * | 3/2021 | Thysell | .................... | B01D 33/82 |
| 11,213,771 B2 * | 1/2022 | Hicks | ...................... | B01D 33/48 |
| 11,680,242 B2 * | 6/2023 | Hazlebeck | ............. | C12M 33/14 210/636 |
| 11,767,501 B2 * | 9/2023 | Hazlebeck | ............. | C12M 41/48 210/636 |
| 11,952,567 B2 * | 4/2024 | Hazlebeck | ............. | C12M 45/00 |
| 12,036,485 B1 * | 7/2024 | Smith | ................ | B01D 11/0288 |
| 12,178,196 B2 * | 12/2024 | Chen | ..................... | B01D 29/68 |
| 12,196,505 B2 * | 1/2025 | Al Ghamdi | ............. | C02F 1/008 |
| 12,371,654 B2 * | 7/2025 | Hazlebeck | ............... | C12N 1/02 |
| 12,376,572 B2 * | 8/2025 | Chen | ..................... | B01D 33/21 |
| 2004/0149233 A1 * | 8/2004 | Cummins | ............... | A01K 63/04 119/227 |
| 2005/0126967 A1 * | 6/2005 | Berry, III | ............. | B01D 33/461 210/396 |
| 2006/0180533 A1 * | 8/2006 | Cummins | ............ | A01K 63/042 210/167.22 |
| 2006/0191828 A1 * | 8/2006 | Cummins | ............ | B01D 33/11 119/260 |
| 2007/0090041 A1 * | 4/2007 | Berry, III | ............. | B01D 33/073 210/402 |
| 2011/0253605 A1 * | 10/2011 | Hu | ...................... | B01D 29/6484 210/414 |
| 2012/0031858 A1 * | 2/2012 | Hu | ........................ | B01D 29/117 210/416.1 |
| 2012/0085694 A1 * | 4/2012 | Hu | ..................... | B01D 29/6484 210/416.1 |
| 2012/0248018 A1 * | 10/2012 | Hopf | ................... | B01D 29/6423 210/159 |
| 2013/0032515 A1 * | 2/2013 | Carayon | .................... | E03F 5/14 210/161 |
| 2013/0043179 A1 * | 2/2013 | Bugg | ................... | B01D 33/067 210/324 |
| 2015/0128838 A1 * | 5/2015 | Bryan | ..................... | E02B 15/04 114/61.1 |
| 2015/0141681 A1 * | 5/2015 | Kelson | .................... | B01D 43/00 554/8 |
| 2015/0265952 A1 * | 9/2015 | Berry, IV | .............. | B01D 33/461 210/396 |
| 2016/0243473 A1 * | 8/2016 | Hicks | ................. | B01D 33/17 |
| 2017/0088435 A1 * | 3/2017 | Schuiten | ............... | B01D 33/06 |
| 2018/0071663 A1 * | 3/2018 | Carayon | ............... | B01D 33/073 |
| 2019/0063027 A1 * | 2/2019 | Shurtleff | ............. | B01D 24/007 |
| 2021/0163871 A1 * | 6/2021 | Deimund | ................. | C12N 1/02 |
| 2022/0259535 A1 * | 8/2022 | Kim | ........................ | C12M 41/36 |
| 2023/0194194 A1 * | 6/2023 | Al Ghamdi | ............. | C02F 1/008 210/698 |
| 2024/0224957 A1 * | 7/2024 | Chen | ..................... | B01D 29/56 |
| 2024/0224958 A1 * | 7/2024 | Chen | ..................... | A01G 33/00 |
| 2024/0375028 A1 * | 11/2024 | Dach | ..................... | C12M 33/14 |
| 2025/0075166 A1 * | 3/2025 | Leffers | .................. | C12M 47/04 |

FOREIGN PATENT DOCUMENTS

| | | |
|---|---|---|
| CN | 105833596 B | 3/2019 |
| CN | 109971641 A | 7/2019 |
| CN | 209475738 U | 10/2019 |
| CN | 212881353 U | 4/2021 |
| FR | 3101522 A1 | 4/2021 |

(56) References Cited

FOREIGN PATENT DOCUMENTS

| WO | WO-2017103805 A1 * | 6/2017 | ................ E02F 7/06 |
| WO | WO-2023037364 A1 * | 3/2023 | ........... B01D 33/466 |
| WO | WO-2024130311 A1 * | 6/2024 | ............ C12M 33/18 |

OTHER PUBLICATIONS

Written Opinion of the International Searching Authority for Application No. PCT/IL2022/050973, dated Dec. 13, 2022, 5 pages.
International Preliminary Report on Patentability for Application No. PCT/IL2022/050973, dated Mar. 5, 2024, 6 pages.
Israel Office Action for Application No. 311297, dated May 30, 2024, 10 pages.
Show et al., "Algal biomass dehydration", ScienceDirect, Bioresource Technology, vol. 135, May 2013, pp. 720-729.
Israel Search Report for Application No. 321624, dated Dec. 21, 2025, 2 pages.

* cited by examiner

ROTARY DRUM FILTERING MACHINE FOR ALGAE FILTRATION

This application is a National Phase application filed under 35 U.S.C. § 371 of PCT International Application No. PCT/IL2022/050973 with an International Filing Date of 6 Sep. 2022, which claims priority to U.S. Provisional Application No. 63/242,833, filed on 10 Sep. 2021, the entire contents of which are incorporated herein by reference.

FIELD OF THE INVENTION

The present invention relates to an algae harvesting device and, more particularly, to an algae filtering device with a horizontal drum.

BACKGROUND OF THE INVENTION

Microalgae are photosynthetic microorganisms that are abundant in nature and capable of growing in various environments. Microalgae biomass can be used to produce numerous value added products, such as: biofuels (e.g., biodiesel, bioethanol, biogas and biohydrogen); fish feed; animal feed; human food supplements including vitamins A, B1, B2, B12, C, E, nicotinate, biotin, folic acid and pantothenic acid; omega 3 fatty acids (e.g., Eicosapentaenoic acid (EPA), Docosahexaenoic acid (DHA)); and chlorophyll and skin care products, such as antiaging creams, anti-irritant creams and skin regeneration creams.

Cultivated microalgae is generally suspended in water or other liquid, for purposes of washing, treating, stabilizing, neutralizing or removing certain elements from the algae, such as harmful bacteria, pH adjustment, or even protein extraction. Numerous physical methods for microalgae dewatering processes have been used to extract microalgae cells from their liquid suspension. These can be divided into four categories: sedimentation, filtration, centrifugation and flotation.

In the filtration method, a permeable medium retains the algae biomass while allowing the liquid to pass through. This technique requires a pressure difference across the filter which can be driven by vacuum, pressure or gravity, such as by using a high-pressure centrifugal pump to provide centrifugal pressure. In many existing filtration devices, the filtered algae is not sufficiently filtered and dehydrated and requires additional filtering. Furthermore, in most cases of micron sized particle filtration, biomass cells are ruptured due to excessively high pressure and shear force, which in turn leads to product damage from oxidation or heating.

China patent application publication CN2726703 entitled "Micro-straining algae removal machine" discloses a microfiltration algae removal machine. The working mode includes continuous water inflow, continuous water discharge and continuous slag discharge. The floating water lifting mechanism placed under water continuously feeds the raw water to be filtered and purified into the inner cavity of the microfiltration drum through the telescopic pipe. The water is filtered out through the microporous filter on the drum. The solid content such as algae, fibers, impurities, etc. trapped on the drum filter net on the sieve body to the top surface of the microfiltration drum is flushed by the flushing device into the slag collecting tray then flows to the lower slag bucket for secondary dehydration.

SUMMARY OF THE INVENTION

In accordance with one aspect of the present invention, there is thus provided a rotary drum filtering machine for filtration of harvested algae. The rotary drum filtering machine comprises at least one filtering drum, axially rotatable about a horizontal axis, the filtering drum comprises a filtration basket comprising a mesh netting thermally coupled thereto, the mesh netting configured for retaining algae and passing through liquid when the filtering drum is rotated. The rotary drum filtering machine further comprises a rotating mechanism, configured to drive the rotation of the filtering drum. The rotary drum filtering machine further lo comprises an inlet pipe, configured for feeding liquid containing the algae into the filtering drum. The rotary drum filtering machine further comprises a scraper, configured for scavenging filtered algae retained on an internal surface of the filtration basket. The rotary drum filtering machine further comprises a collector, configured for collecting scraped filtered algae. The rotary drum filtering machine further comprises an outlet pipe, configured for removal of collected filtered algae. The filtering drum may comprise a filtration basket support frame, comprising a hollow cylindrical member configured with a plurality of perforations circumferentially arranged around the surface thereof, where the filtration basket is axially embedded within and releasably secured to the filtration basket support frame. The rotating mechanism may include: a plurality of wheels, coupled to a the filtration basket support frame; and/or at least one electric motor, configured to drive rotation of the wheels, to transfer rotational torque to propel an axial rotation of the filtering drum. The drum frame may include at least one circular rail, axially enclosing an exterior surface of the filtration basket support frame, and configured to engage with at least one of the wheels, such that rotation of the wheels provides rotational torque along the rail to propel rotation the filtration basket support frame. The mesh netting may be thermally pressed into the filtration basket such that polymer material of the drum basket penetrates through apertures of the mesh netting, and at least one polymeric rod is thermally pressed onto the mesh netting such that the polymer material of the filtration basket fuses to the polymer rod with the mesh netting contained therebetween. The mesh netting may include a wired mesh having a wire diameter less than 1,000 μm and comprising micron sized apertures having an aperture diameter of 1 μm-500 μm, to enable filtration of micron sized algae. The mesh netting may comprise a plain Dutch weave pattern. The rotary drum filtering machine may further comprise least one sensor, configured to detect or monitor at least one parameter relating to the algae or filtration process. The parameter may include at least one of: pH level; temperature; humidity; turbidity; color; flow rate; electrical conductivity; viscosity; electrical output; rotation speed; weight; and timing information. The monitored parameters may be configured to be processed using a cloud computing platform to generate at least one report, notification, or recommendation relating to the filtration and provided on a user interface. The rotary drum filtering machine may comprise an array of filtering drums having a plurality of mesh netting aperture sizes, configured such that a filtration output of a first filtering drum of the array, having a first mesh netting aperture size, is transferable to a second filtering drum of the array, having a second and smaller mesh netting aperture size. The rotary drum filtering machine may be configured to operate in a batch mode or a continuous mode, allowing for periodic or continuous removal of filtered algae.

In accordance with another aspect of the present invention, there is thus provided a method for filtration of harvested algae. The method comprises steps of: providing a rotary drum filtering machine comprising: at least one filtering drum, axially rotatable about a horizontal axis, the filtering drum comprising a filtration basket comprising a thermally coupled mesh netting, configured for retaining algae and passing through liquid when the filtering drum is rotated. The method further comprises the step of feeding liquid containing the algae into a filtering drum via an inlet pipe. The method further comprises the step of rotating the filtering drum with a rotating mechanism, such that the algae is retained on an internal surface of the filtration basket of the filtering drum while liquid passes through the mesh netting of the filtration basket. The method further comprises the steps of: scraping filtered algae retained on the internal surface of the filtration basket using a scraper, collecting scraped filtered algae in a collector, and removing collected filtered algae via an outlet pipe. The filtration basket may be axially embedded within and releasably secured to a filtration basket support frame, comprising a hollow cylindrical member configured with a plurality of perforations circumferentially arranged around the surface thereof. The mesh netting may be thermally pressed into the drum basket such that polymer material of the drum basket penetrates through apertures of the mesh netting, and at least one polymeric rod is thermally pressed onto the mesh netting such that the polymer material of the filtration basket fuses with the polymer rod with the mesh netting contained therebetween. The mesh netting may comprise a wired mesh having a wire diameter less than 1,000 μm and comprising micron sized apertures having an aperture diameter of 1 μm-500 μm, to enable filtration of micron sized algae. The method may comprise the step of detecting or monitoring at least one parameter relating to the algae or filtration process using at least one sensor. The parameter may include at least one of: pH level; temperature; humidity; turbidity; color; flow rate; electrical conductivity; viscosity; electrical output; rotation speed; weight; and timing information. The method may further comprise the step of processing monitored parameters using a cloud computing platform, to generate at least one report, notification, or recommendation relating to the filtration, and providing on a user interface. The rotary drum filtering machine may comprise an array of filtering drums having a plurality of mesh netting aperture sizes, configured such that a filtration output of a first filtering drum of the array, having a first mesh netting aperture size, is transferable to a second filtering drum of the array, having a second and smaller mesh netting aperture size. The rotary drum filtering machine may be configured to operate in a batch mode or a continuous mode, allowing for periodic or continuous removal of filtered algae.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The following description is provided, so as to enable any person skilled in the art to make use of said invention and sets forth the best modes contemplated by the inventor of carrying out this invention. Various modifications, however, are adapted to remain apparent to those skilled in the art, since the generic principles of the present invention have been defined specifically to provide a rotary drum filtering machine for filtration of harvested algae and a method of doing the same.

The present invention overcomes the disadvantages of the prior art by providing a filtering machine and method for filtration of harvested algae in the micron size range (e.g., between 1 μm-1,000 μm), which applies low pressure and low shear force, and is capable of operating at high volumes and high separation efficiency. The disclosed filtering machine and method may be applied on different biomass sources, including but not limited to: cyanobacteria, yeast, microalgae, animal cells, organic particles (e.g., protein, lysosomes), inorganic particulates, where cellular or particle integrity may be important. The filtering machine may operate using batch mode processing continuous mode processing, and may include a plurality of filtering drums coupled in series to enable filtration of different types of biomass material in each filtering drum.

The term "algae" is used herein to broadly refer to a group of taxonomically unrelated organisms that generally share common traits (with certain exceptions), such as: oxygenic photosynthesis, chlorophylls as main photosynthetic pigment, lack of differentiated tissues; and predominantly producers in aquatic ecosystems, including but not limited to: eukaryotic microalgae and seaweeds; unicellular microalgae (e.g., *Chlorella*) and multicellular algae (e.g., bladder kelp); and prokaryotic organisms such as cyanobacteria.

The terms "user" and "operator" are used interchangeably herein to refer to any individual person or group of persons using or operating a method, device or machine in accordance with embodiments of the present invention.

Figure 1:
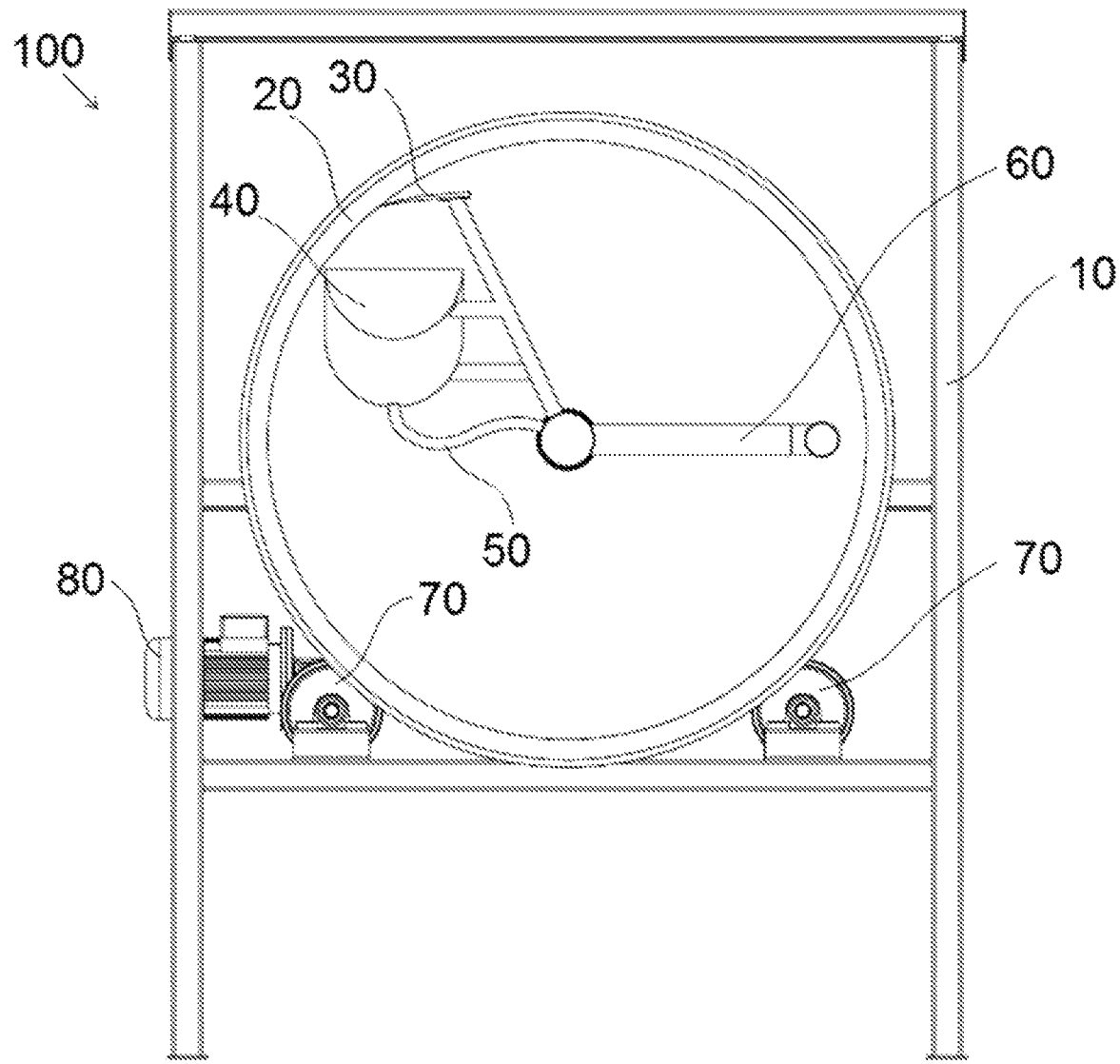
FIG. 1 is a schematic side view illustration of a rotary drum filtering machine, constructed and operative in accordance with an embodiment of the present invention.

Reference is now made to FIG. 1 presenting a schematic side view illustration of a rotary drum filtering machine, generally referenced 100, constructed and operative in accordance with an embodiment of the present invention. Filtering machine 100 includes a bearing frame 10, a filtering drum 20, 1o a scraper 30, a collector 40, a drain pipe 50, a piping arrangement 60, a plurality of wheels 70, and an electric motor 80. Filtering drum 20 is rotatably mounted on wheels 70 on bearing frame 10. Wheels 70 are driven by electric motor 80 to transfer rotational torque to filtering drum 20, to initiate an axial rotation of filtering drum 20 about the longitudinal axis thereof, which is aligned substantially horizontally (relative to the ground). It is appreciated that wheels 70 and/or electric motor 80 may be embodied by other suitable components configured for generating and transferring rotational energy to initiate the rotation of filtering drum 20. Piping arrangement 60 includes an inlet pipe (shown in FIG. 2), for feeding water containing algae, and an outlet pipe (shown in FIG. 2) for removing dehydrated (filtered) algae from filtering drum 20. Scraper 30 may be any tool configured to scavenge and scrape off algae particles carried by an internal surface of filtering drum 20. The accumulated algae particles fall gravitationally into collector 40, which may be any suitable container or receptacle, such as a trough. The collected algae is then conveyed via drain pipe 50 to the outlet pipe of piping arrangement 60 for removal.

Figure 2:
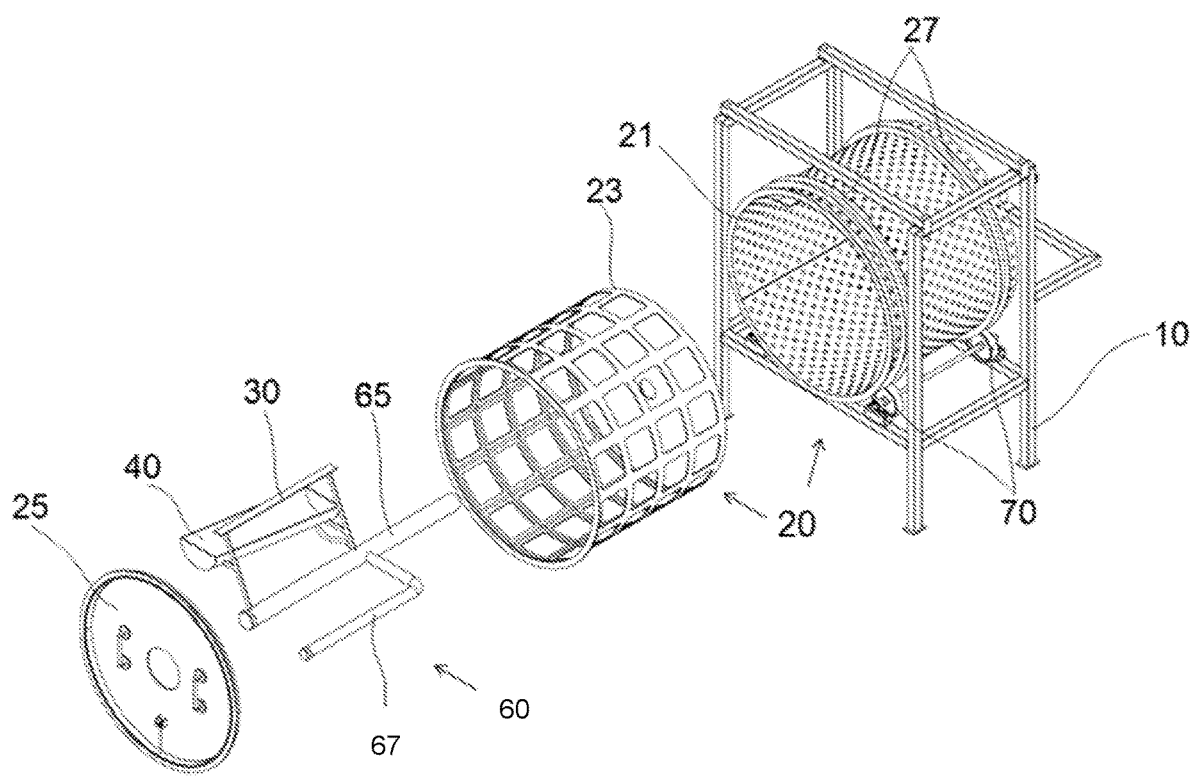
FIG. 2 is an exploded view illustration of a rotary drum filtering machine, constructed and operative in accordance with an embodiment of the present invention.

Reference is now made to FIG. 2 presenting an exploded view illustration of a rotary drum filtering machine, constructed and operative in accordance with an embodiment of the present invention. Filtering drum 20 of filtering machine 100 includes a filtration basket 23 and a filtration basket support frame 21. Support frame 21 may include a hollow cylindrical member configured with a plurality of small perforations circumferentially arranged around its surface. The cylindrical member is mounted and supported on a scaffold 10, which includes a base frame and end frame with scaffold legs composed of metal rods. A pair of circular rails 27 axially enclose the exterior surface of support frame 21 at each end thereof. Rails 27 are engaged with respective pairs of wheels 70 mounted on opposing ends of scaffold 10, such that the rotation of wheels 70 (when driven by electric motor 80) provides rotational torque along rails 27 to propel the rotation of support frame 21 and filtration basket 23. For example, there may be two pairs of wheels 70 (i.e., four wheels in total) mounted on scaffold 10 with one wheel group on each end thereof, and two rails 27 on support frame 21, with each rail engaging a respective wheel group, although an alternate number of wheels, wheel groups and/or rails may be applicable to provide rotation of drum frame. It is appreciated that support frame 21 and/or scaffold 10 may be embodied by other suitable structures configured for supporting a filtration basket 23 and providing rotational torque thereto. Filtration basket 23 of filtering drum 20 is a hollow cylindrical member configured with a plurality of large apertures (i.e., larger than the perforations of support frame 21), circumferentially arranged around the surface of filtration basket 23. Filtration basket 23 is axially embedded within the hollow core of support frame 21, and releasably secured thereto, providing a rigidifying arrangement of filtering drum 20. Filtration of algae is performed on a micron-sized mesh netting or "micro-mesh netting", also referred to herein as a "micronet", which is thermally attached to filtration basket 23.

Figure 3:
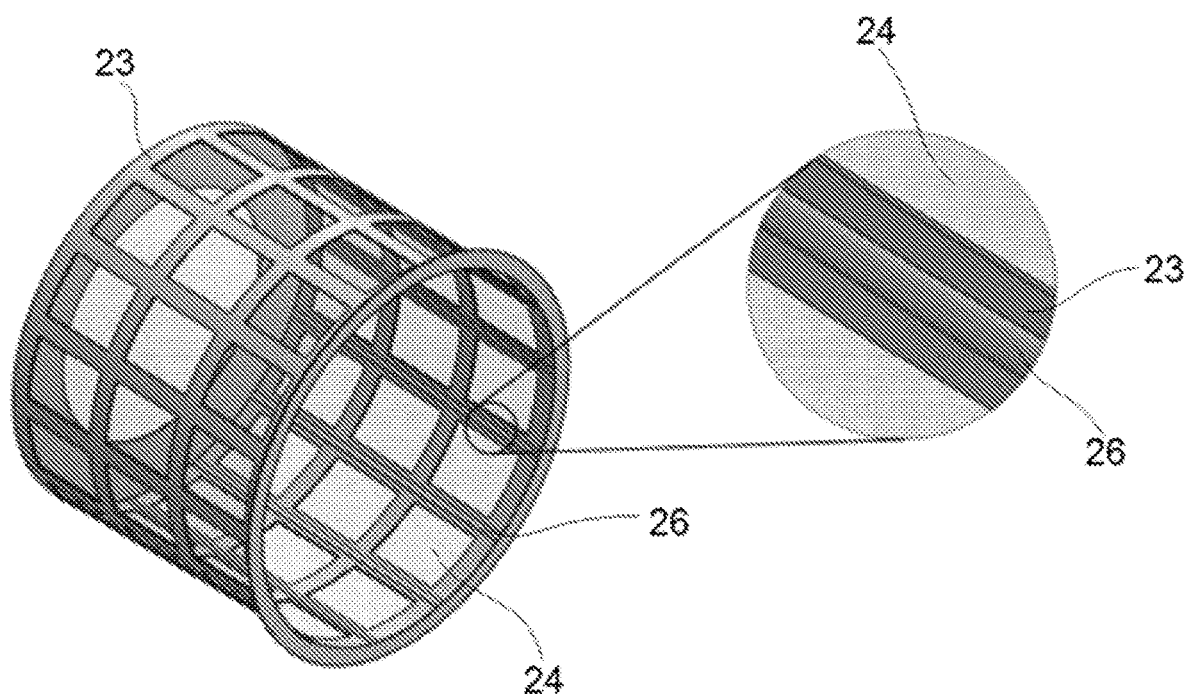
FIG. 3 is an isometric view of a filtration basket of a filtering drum of a rotary drum filtering machine, constructed and operative in accordance with an embodiment of the present invention.

Reference is made to FIG. 3, presenting an isometric view of a filtration basket (23) of a filtering drum, constructed and operative in accordance with an embodiment of the present invention. Filtration basket 23 is made of polymer material defining a sequence of apertures interspersed axially and longitudinally between drum basket portions, with a micron sized mesh netting (micronet) pressed onto the internal surface of drum basket 23 in a thermal process (further described hereinbelow). A plurality of polymer rods 26 are embedded longitudinally along the internal surface of the drum basket portions (i.e., between the apertures), to facilitate attachment of micronet 24.

Figure 4A:
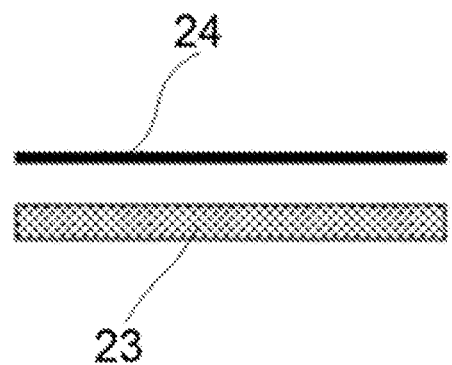
FIGS. 4A to 4C illustrate a sequence of steps for attaching a micron-sized mesh netting to a filtration basket of a filtering drum, operative in accordance with an embodiment of the present invention.
Figure 4B:
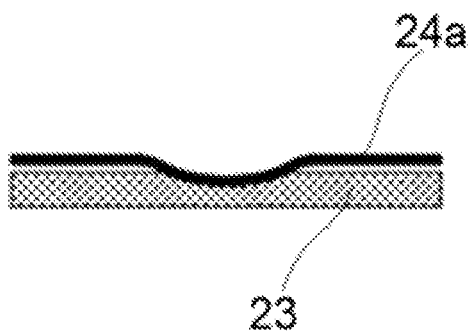
Figure 4C:
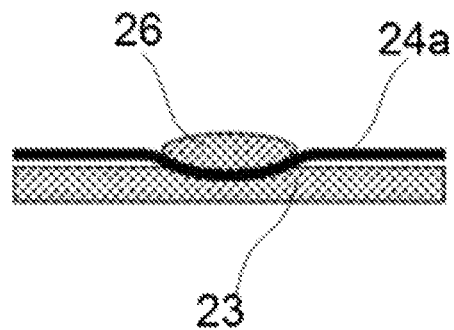

Reference is now made to FIGS. 4A, 4B and 4C, illustrating a sequence steps for attaching a micro-sized mesh netting (24) to a filtration basket (23) of a filtering drum (20), operative in accordance with an embodiment of the present invention. Specifically, FIG. 4A shows micronet 24 and filtration basket 23 prepared for securing to each other. Micronet 24 includes mesh openings sized between approximately 1 µm-500 µm, to enable filtration of algae particles of micron size of between approximately 1 µm-1,000 µm (single cell diameter, or filament helical diameter/filament length in the case of spirulina). Micronet 24 may be composed of a wired mesh material with a wire diameter of less than 1,000 µm, and may be corrosion resistant (specifically to high salinity and acidity) and composed of food-grade materials (e.g., stainless steel compositions 316SS, 304SS; polypropylene (PP); polyethylene (PE); nylon; polyester; and the like). Micronet 24 may be characterized by a designated weave pattern, such as a plain Dutch weave, i.e., with larger warp wires than weft wires, which may provide a high filtering level and high pressure load resistance. In FIG. 4B, micronet 24 is thermally pressed into filtration basket 23 such that the polymeric material of filtration basket 23 penetrates via apertures of micronet 24. In a final stage depicted in FIG. 4C, a polymer welding rod 26 is thermally pressed onto micronet 24, such that polymeric materials of filtration basket 23 and rod 26 are welded or fused to each other with micronet 24 contained in between. It is noted that filtration basket 23 and polymer rod 26 should fuse together for micronet 24 to be embedded properly, with a melting point significantly lower (e.g., by at least 50%) in comparison to that of micronet 24 (e.g., a polypropylene based micronet having a melting point of around 160° C.).

Referring back to FIG. 2, feeding water containing algae flows into filtering drum 20 via inlet pipe 65. The rotation of filtering drum 20 (including filtration basket 23 with thermally pressed micronet 24 causes the feeding water to pass through the mesh netting of micronet 24 while retaining the (larger sized) algae particles within filtration basket 23. It is noted that the algae may be suspended within other forms of liquid suspension, i.e., not necessary water, and the description herein is provided in the context of water for exemplary purposes only. Scraper 30 combs through the internal surface of filtration basket 23 accumulating the retained filtered algae particles, which are collected in trough 40. The collection of the filtered algae may be passive through gravitational force, or active such as by using a vacuum or some form of mechanical pressure application. The collected filtered algae is then conducted via drain pipe 50 through outlet pipe 67, which may intersect through an internal space of inlet feeding pipe 65, such that the collected algae passes from trough 40 through a section of inlet feeding pipe and out through outlet pipe 67. This may facilitate operation of rotary drum filtering machine 100 in batch or continuous modes, allowing for constant or periodic removal of filtrate. An access door 25 releasably secured to a proximal end of filtering drum 20, may be opened and released to enable removal of the filtered algae from filtering machine 100, or alternatively outlet pipe 67 may pass through an opening of access door 25 for accessing the filtered algae.

Figure 5:
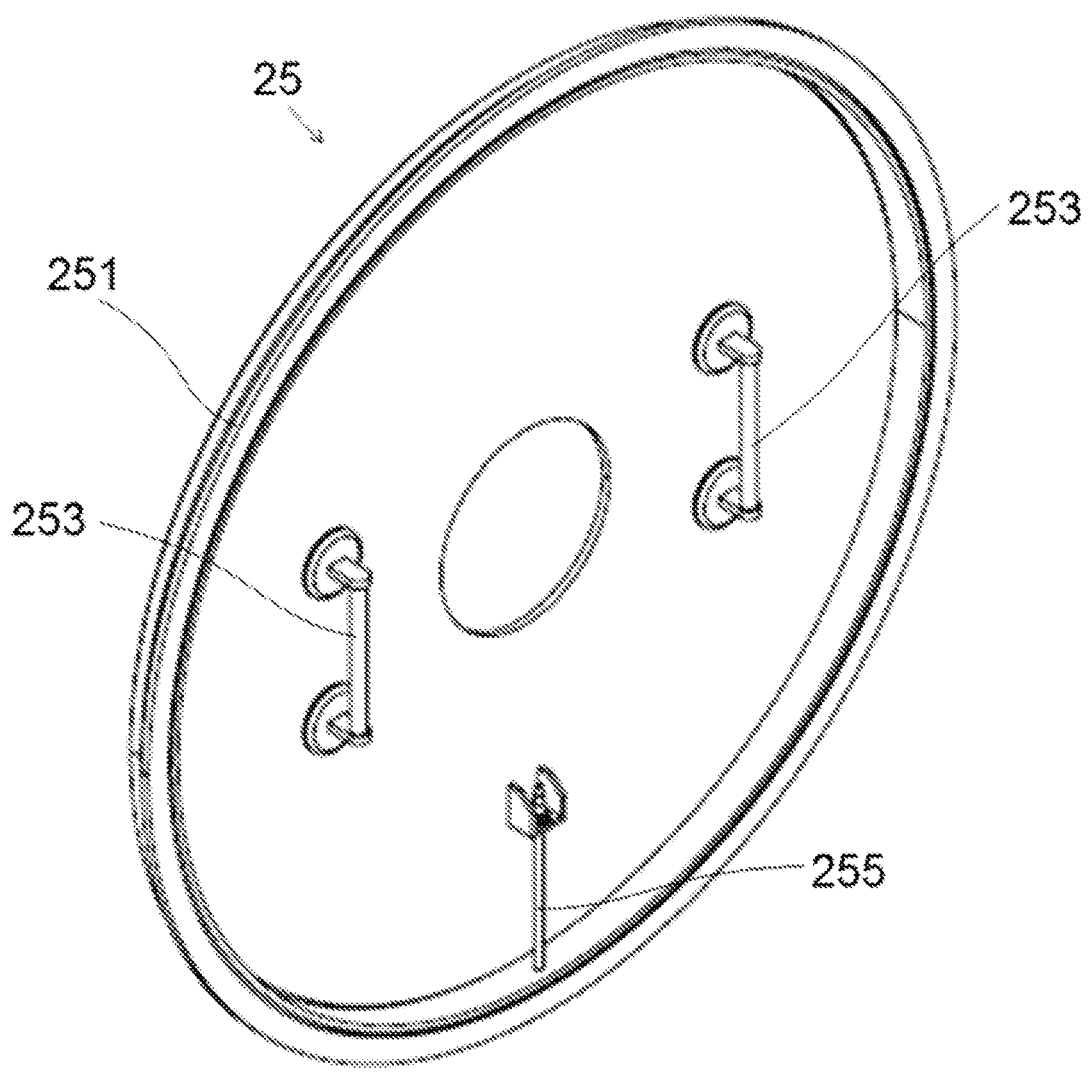
FIG. 5 is an isometric view of an access door of a filtering drum, constructed and operative in accordance with an embodiment of the present invention.
Figure 6:
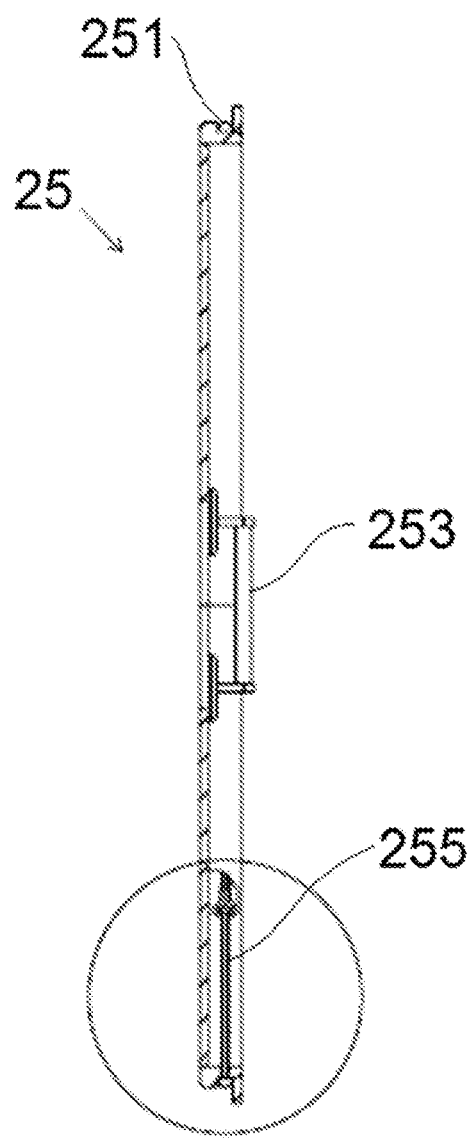
FIG. 6 is a cross-sectional view of the access door of FIG. 5, constructed and operative in accordance with an embodiment of the present invention.
Figure 7:
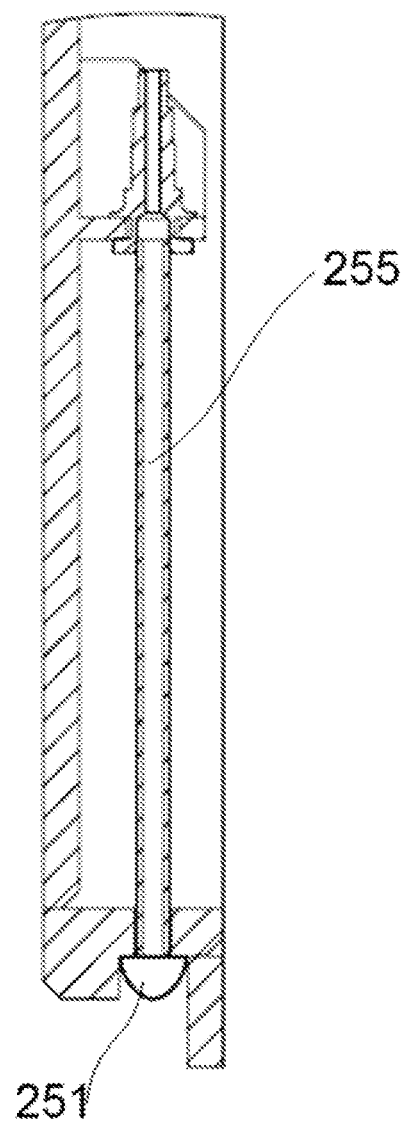
FIG. 7 is an enlarged cross-sectional view of the access door of FIG. 5, constructed and operative in accordance with an embodiment of the present invention.

Reference is now made to FIGS. 5 to 7 presenting an isometric view, a cross-sectional view, and an enlarged cross-sectional view, respectively, of access door 25 of filtering drum 20. Access door 25 includes at least one handle 253 and an inflatable gasket 251. To secure access door 25 to filtering drum 20, access door 25 is placed on an open perimeter at a longitudinal end of filtering drum 20, and inflatable gasket 251 is inflated via an inflation/deflation pipe 255. To release access door 25 from filtering drum 20, inflatable gasket 251 is deflated via inflation/deflation pipe 255. A control valve (not shown) is configured for maintaining gasket 251 inflated when access door 25 should be secured to filtering drum 20, and for deflating gasket 251 when access door 25 should be released from filtering drum 20.

Filtering machine 100 may further include one or more sensors for detecting and monitoring different parameters relating to the filtered algae and the filtration process. For example, filtering machine 100 may include biosensors, including but not limited to: inlet/outlet flow rate sensors; a drum weight sensor; a pH level sensor; an electrical conductivity sensor; a temperature sensor; a turbidity sensor; an image color analysis sensor; a rotational speed or motor output sensor; a hatch (access door) state (open/closed) sensor; a room temperature sensor; a humidity sensor; a washing liquid volume/flow sensor; a weight sensor; a timer; a vibration sensor; and the like. The sensors may be configured for sensing and monitoring parameters of the algae, before, during and after the filtration process, including but not limited to: type, quantity, or size of algae; pH level; temperature level; turbidity; color; flow rates; electrical conductivity; viscosity; humidity; electrical output; rotation speed; weight differences; timing information; and the like.

Figure 8:
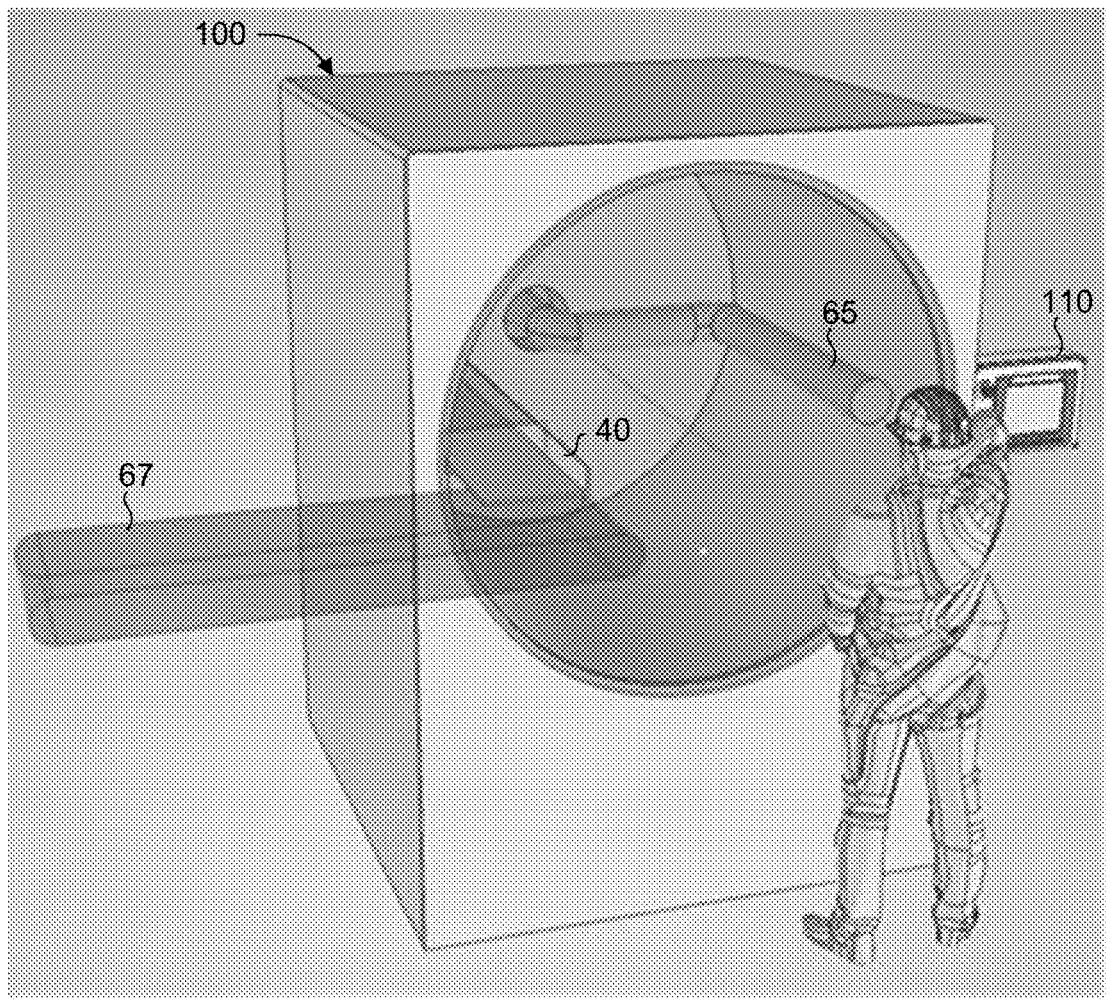
FIG. 8 is a perspective sectional view illustration of a rotary drum filtering machine in operation, constructed and operative in accordance with an embodiment of the present invention.

Reference is made to FIG. 8, which is a perspective sectional view illustration of a rotary drum filtering machine (100) in operation, constructed and operative in accordance with an embodiment of the present invention. Filtering machine may further include a user interface 110, for providing an operator with a visual and/or audible representation of operational parameters and other aspects relating to the filtering process and/or the filtered algae. For example, user interface 110 may include at least one of a display screen and an audio speaker, configured to provide visual or audible notifications relating the filtration process. Monitored parameters and other collected data may be uploaded and dynamically processed remotely using a cloud computing platform. Cloud computing processing may apply machine learning techniques (e.g., a neural network algorithm; a regression algorithm) to large data collections, such as parameters and results obtained from multiple filtration operations at various times and locations, and may generate reports, operational insights, notifications and recommendations that may be utilized to optimize or improve subsequent filtrations.

According to an aspect of the present invention, the filtering machine may include a plurality of filtering drums, which may be coupled in series or in parallel. For example, filtering machine 100 may include multiple filtering drums 20 of different types connected in series, where each filtering drum 20 has a micronet with a particular sized mesh netting (e.g., smaller or larger mesh apertures) adapted for collecting different types of biomass particles of varying sizes. An array of filtering drums may be operated simultaneously to allow for gradual filtration and biomass classification based on particle size, for example, a drum array installation where the permeate of a first filtering drum is transferred to a second filtering drum in a series of filtering drums having decreasing micronet sizes. More generally, the disclosed filtering machine may enable uniform or gradual filtering and classification, such as by employing a single filtering drum with a selected mesh netting size to implement uniform filtering for a selected algae particle size, or by employing an array of filtering drums with decreasing mesh netting sizes to implement gradual removal and classification based on algae particle size. The filtering drums may be interchangeable, such that, for example, if one of the filtering drums malfunctions or requires maintenance or replacement, then only that filtering drum may be removed and replaced without effecting the operation of the remaining filtering drums.

The disclosed filtration machine and method may operate in a batch process (i.e., in which multiple sets of raw input are processed in batches over a sequence of one or more method steps) or in a continuous process (i.e., in which the raw input is fed and processed continuously through each step of the method). For example, batch mode and continuous mode operation may be applied in the context of the harvesting order of multiple algae ponds, where each pond represents an individual batch. When a given algae pond is harvested, the operation of the filtration machine is continuous with algae filtrate constantly generated and unloaded. When moving from one algae pond to another, the filtration machine needs to be suspended and cleaned before continuing to the next pond so as to prevent cross-contamination, thereby altering between continuous and batch mode operations.

It is appreciated that the filtering machine and filtration method of the present invention may provide efficient inside-out filtration of algae and other biomass sources using only rotational torque and gravitational force, without requiring the application of substantial pressure across the filtering element (such as a centrifugal pressure) by a dedicated pressure device (such as a pump). This is particularly useful for biomass particles which may be highly sensitive to applied pressure and where cellular or particle integrity is important, such as filamentous microorganisms, e.g., cyanobacteria, diatoms, animal cells, or any microorganisms having a fragile structure and lacking cellular walls. The disclosed filtering machine may also be capable of operating at a high volume capacity (e.g., in the range of 1-1000 $m^3$/hour) and a high separation efficiency (e.g., in the range of 50-100% particulate matter). The effective operation may be facilitated by the characteristics of the micron-sized mesh netting (micronet) and its thermal pressing with the drum basket of the filtering drum.

According to a further embodiment of the present invention, a method for filtration of harvested algae is provided. The method comprises the step of: providing a rotary drum filtering machine including at least one filtering drum, axially rotatable about a horizontal axis, the filtering drum having a filtration basket with a thermally coupled mesh netting configured for retaining algae and passing through liquid when the filtering drum is rotated. The method further comprises the steps of: feeding liquid containing the algae into the filtering drum via an inlet pipe; scraping filtered algae retained on the internal surface of the filtration basket using a scraper; collecting scraped filtered algae in a collector; and removing collected filtered algae via an outlet pipe. The mesh netting may be thermally pressed into the filtration basket such that the filtration basket polymer material penetrates through the mesh netting apertures, and a polymeric rod thermally pressed onto the mesh netting fuses to the filtration basket polymer material with the mesh netting contained therebetween. The mesh netting may include a wired mesh, with a wire diameter less than 1,000 μm and micron sized apertures having an aperture diameter of 1 μm-500 μm, to enable filtration of micron sized algae (e.g., between 1 μm-1,000 μm).

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A rotary drum filter for harvesting algae from a liquid stream containing algae, the rotary drum filter comprising:
   a filtration drum (20), rotatably mounted for rotation about a horizontal axis, the filtration drum (20) comprising:
      a filtration basket (23) disposed within the filtration drum (20), comprising a mesh netting (24) thermally coupled to the filtration basket (23) and capable of retaining algae as liquid passes through the mesh netting (24) when the filtration drum (20) is rotated;
      a rotating mechanism, configured to rotate the filtration drum (20);
      an inlet pipe (65), configured for feeding the liquid stream containing the algae into the filtration drum (20);
      a scraper (30), disposed within the filtration basket (23) and adjacent an internal surface of the filtration basket (23) for scraping filtered algae off the internal surface;
      a collector (40), disposed within the filtration basket (23) and positioned so that it may collect scraped filtered algae; and
      an outlet pipe (67), configured for removal of collected filtered algae.

2. The rotary drum filter of claim 1, wherein the filtration drum comprises a filtration basket support frame, comprising a hollow cylindrical member including a plurality of perforations circumferentially arranged around the surface thereof, wherein the filtration basket is axially embedded within and releasably secured to the filtration basket support frame.

3. The rotary drum filter of claim 2, wherein the rotating mechanism comprises at least one of:
   a plurality of wheels, coupled to the filtration basket support frame; and
   at least one electric motor, configured to drive rotation of the wheels, to transfer rotational torque to propel an axial rotation of the filtering drum.

4. The rotary drum filter of claim 3, wherein the filtration basket drum frame comprises at least one circular rail, axially enclosing an exterior surface of the filtration basket support frame, and configured to engage with at least one of the wheels, such that rotation of the wheels provides rotational torque along the rail to propel rotation of the filtration basket support frame.

5. The rotary drum filter of claim 1, wherein the mesh netting is thermally pressed into the filtration basket such that polymer material of the drum basket penetrates through apertures of the mesh netting, and at least one polymeric rod is thermally pressed onto the mesh netting such that the polymer material of the filtration basket fuses to the polymer rod with the mesh netting contained therebetween.

6. The rotary drum filter of claim 1, wherein the mesh netting comprises a wired mesh, having a wire diameter less than 1,000 μm and comprising micron sized apertures having an aperture diameter of 1 μm-500 μm, to enable filtration of micron sized algae.

7. The rotary drum filter of claim 1, further comprising at least one sensor, configured to detect or monitor at least one parameter selected from the group consisting of: pH level; temperature; humidity; turbidity; color; flow rate; electrical conductivity; viscosity; electrical output; rotation speed; weight; and timing information.

8. The rotary drum filter of claim 7, wherein at least one of the sensor monitored parameters is configured to be processed by a cloud computing platform to generate at least one of a report, a notification, or recommendation relating to the filtration and provided on a user interface.

9. The rotary drum filter of claim 1, comprising an array of filtering drums having a plurality of mesh netting aperture sizes, configured such that a filtration output of a first filtering drum of the array, having a first mesh netting aperture size, is transferable to a second filtering drum of the array, having a second and smaller mesh netting aperture size smaller than the first mesh netting aperture size.

10. The rotary drum filter of claim 1, wherein the mesh netting comprises a plain Dutch weave pattern.

11. A method for filtration of harvested algae, the method comprising steps of: providing a rotary drum filter for harvesting algae from a liquid stream containing algae, the rotary drum filter comprising:
   a filtration drum (20), rotatably mounted for rotation about a horizontal axis, the filtration drum (20) comprising:
      a filtration basket (23) disposed within the filtration drum (20), comprising a mesh netting (24) thermally coupled to the filtration basket (23) and capable of retaining algae as liquid passes through the mesh netting (24) when the filtration drum (20) is rotated;
      a rotating mechanism, configured to rotate the filtration drum (20);
      an inlet pipe (65), configured for feeding the liquid stream containing the algae into the filtration drum (20);
      a scraper (30), disposed within the filtration basket (23) and adjacent an internal surface of the filtration basket (23) for scraping filtered algae off the internal surface;
      a collector (40), disposed within the filtration basket (23) and positioned so that it may collect scraped filtered algae; and
      an outlet pipe (67), configured for removal of collected filtered algae;
   introducing a liquid stream containing algae into the filtration drum through the inlet pipe;
   rotating the filtration drum causing liquid to flow through the mesh netting while retaining algae on the internal surface;
   scraping off the algae retained on the internal surface;
   collecting the scraped off algae in the collector; and
   removing the collected algae through the outlet pipe.

12. The method for filtration of harvested algae of claim 11, wherein, the rotary filter drum is configured to operate in a batch mode or a continuous mode, allowing for periodic or continuous removal of filtered algae.

* * * * *